(12) United States Patent
Searcy et al.

(10) Patent No.: US 11,750,286 B2
(45) Date of Patent: Sep. 5, 2023

(54) LASER COMMUNICATION APPARATUS AND ASSOCIATED METHODS

(71) Applicant: BridgeComm, Inc., Denver, CO (US)

(72) Inventors: Paul Searcy, Niwot, CO (US); Barry Matsumori, Rolling Hills Estates, CA (US)

(73) Assignee: BridgeComm, Inc., Denver, CO (US)

(*) Notice: Subject to any disclaimer, the term of this patent is extended or adjusted under 35 U.S.C. 154(b) by 887 days.

(21) Appl. No.: 16/258,117

(22) Filed: Jan. 25, 2019

(65) Prior Publication Data

US 2023/0084166 A1    Mar. 16, 2023

Related U.S. Application Data

(60) Provisional application No. 62/712,203, filed on Jul. 30, 2018, provisional application No. 62/636,175, filed on Feb. 28, 2018, provisional application No. 62/622,140, filed on Jan. 26, 2018, provisional application No. 62/622,136, filed on Jan. 26, 2018.

(51) Int. Cl.
*H04B 10/118* (2013.01)

(52) U.S. Cl.
CPC ................. *H04B 10/118* (2013.01)

(58) Field of Classification Search
None
See application file for complete search history.

(56) References Cited

U.S. PATENT DOCUMENTS

| | | | |
|---|---|---|---|
| 4,134,007 A * | 1/1979 | Koreicho | H01L 31/02325 362/477 |
| 6,504,634 B1 | 1/2003 | Chan et al. | |
| 6,650,451 B1 * | 11/2003 | Byers | H04B 10/1125 398/158 |
| 6,856,459 B1 | 2/2005 | Islam et al. | |
| 8,301,027 B2 * | 10/2012 | Shaw | H01S 5/423 398/118 |
| 9,723,386 B1 | 8/2017 | Ni et al. | |
| 10,003,402 B2 * | 6/2018 | Boroson | H04B 10/118 |
| 10,090,959 B2 * | 10/2018 | Lambert | H04B 10/29 |
| 10,707,966 B2 | 7/2020 | Velazco | |
| 11,082,128 B1 | 8/2021 | Dickson | |
| 2001/0043379 A1 * | 11/2001 | Bloom | H04B 10/2587 398/128 |
| 2001/0043381 A1 * | 11/2001 | Green | H04B 10/2587 398/126 |
| 2002/0012139 A1 * | 1/2002 | Willebrand | H04B 10/1149 398/118 |
| 2004/0141753 A1 | 7/2004 | Euw et al. | |

(Continued)

OTHER PUBLICATIONS

Wang et al., Liquid-crystal blazed-grating beam deflector, 2000, Optical Society of America (Year: 2000).*

(Continued)

*Primary Examiner* — Jai M Lee
(74) *Attorney, Agent, or Firm* — Neugeboren O'Dowd PC

(57) ABSTRACT

An optical communications transceiver, for use in free space communication between a satellite and a ground station, includes multiple sub-apertures for receiving signal over a plurality of angles, wherein the sub-apertures are fixed. In an embodiment, the transceiver is further configured for transmitting signal over the plurality of angles without physically moving the transceiver to those angles.

14 Claims, 9 Drawing Sheets

(56) References Cited

U.S. PATENT DOCUMENTS

| | | | |
|---|---|---|---|
| 2007/0177880 A1* | 8/2007 | Karasikov | H04B 10/2587 398/170 |
| 2007/0242958 A1* | 10/2007 | Ieda | H04B 10/1121 398/186 |
| 2009/0202254 A1* | 8/2009 | Majumdar | H04B 10/1123 398/140 |
| 2014/0294399 A1* | 10/2014 | Makowski | H04B 10/118 398/126 |
| 2015/0349881 A1 | 12/2015 | Byers | |
| 2016/0204866 A1* | 7/2016 | Boroson | H04B 10/61 398/97 |
| 2016/0204899 A1 | 7/2016 | Kojima et al. | |
| 2016/0226584 A1* | 8/2016 | Chalfant, III | H04B 10/112 |
| 2016/0329961 A1 | 11/2016 | Li et al. | |
| 2018/0026721 A1* | 1/2018 | Bock | H04B 10/64 398/130 |
| 2018/0041279 A1 | 2/2018 | Segura et al. | |
| 2019/0229805 A1* | 7/2019 | Velazco | H04B 10/503 |
| 2020/0186258 A1 | 6/2020 | Brown et al. | |
| 2020/0225559 A1* | 7/2020 | Stone | H04B 10/1123 |
| 2020/0343973 A1 | 10/2020 | Geisler et al. | |

OTHER PUBLICATIONS

U.S. Appl. No. 17/193,464, mailed Mar. 7, 2022.
Notice of Allowance issued for U.S. Appl. No. 17/193,464, dated Mar. 7, 2022.

\* cited by examiner

LASER COMMUNICATION APPARATUS AND ASSOCIATED METHODS

FIELD OF THE INVENTION

The present invention relates to laser communications and, more particularly, to laser communication transceivers for communicating between ground, satellite, and moving objects such as aircraft, drones, boats, ships, unmanned autonomous vehicles (UAVs), and land vehicles.

BACKGROUND OF THE INVENTION

Current communication systems rely on the use of radio frequencies (RF) for the data downlink from Low Earth Orbit (LEO) small satellite (SmallSat). An illustration of a variety of currently available communication configurations is shown in FIG. 1. As shown in FIG. 1, communication channels between different Geostationary Equatorial Orbit (GEO) satellites, between a GEO satellite and LEO satellites, between a GEO satellite and a ground station, mobile user on an aircraft or submarine, or an unmanned autonomous vehicle (UAV) are currently possible. However, there are limitations to the data rates and data capacity of RF SmallSats due to the frequency range and mechanical limitations of the current systems.

In addition, the transceivers and ground stations of current systems require gimbals and other large mechanical means for physically scanning the field of view of the devices through a range of angles in order to be able to capture signal over those angles. This requirement is due to the fact that the currently available transceivers include a single aperture telescope for capturing and transmitting data signals therebetween. Such mechanical implementations are impractical or even detrimental for physical space and weight constrained applications such as on airplanes and UAVs.

SUMMARY OF THE INVENTION

In accordance with the embodiments described herein, an optical communications transceiver configured for free space communication between a satellite and a ground station or a moving object (such as an aircraft, ground vehicle, or personnel, and the ground station, the transceiver including multiple sub-apertures for receiving or transmitting signal over a plurality of angles without physically adjusting the orientation of the transceiver.

DETAILED DESCRIPTION OF EMBODIMENTS OF THE INVENTION

Figure 1:
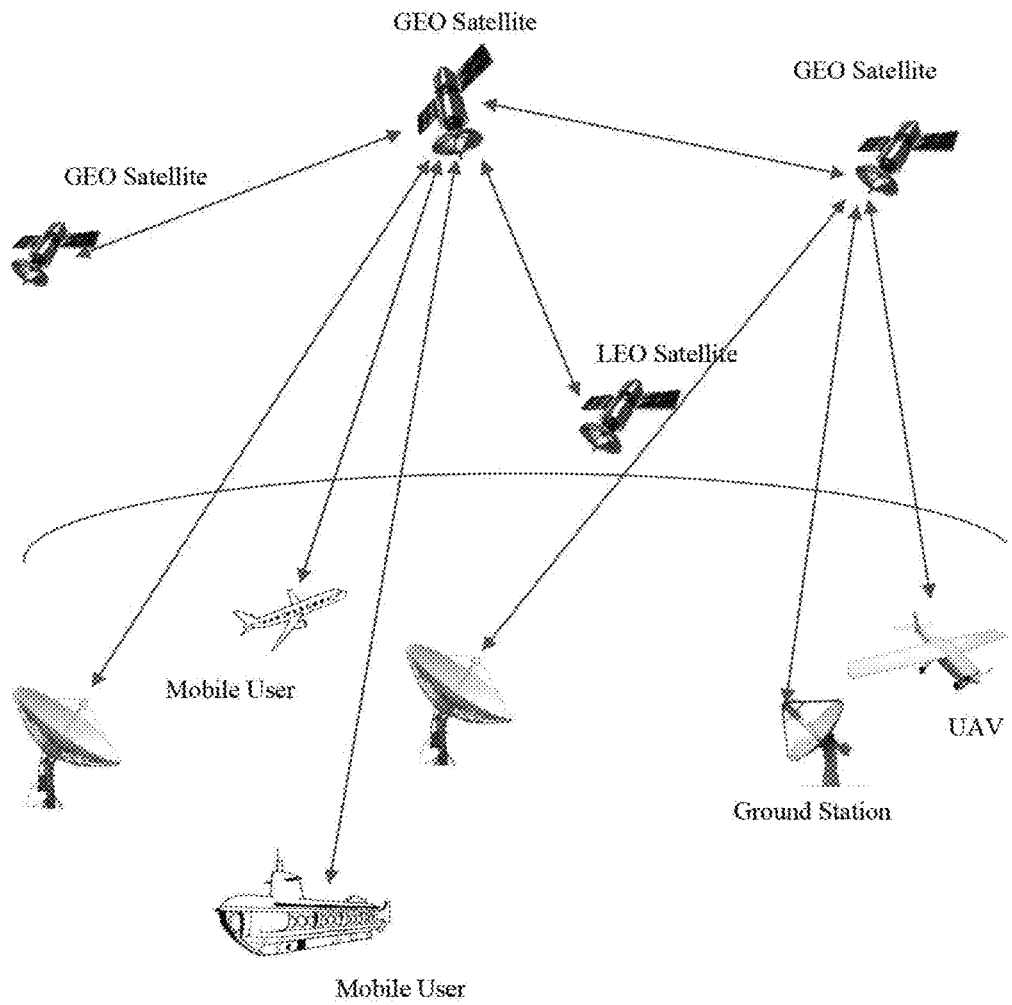
FIG. 1 illustrates a variety of communication configurations between different components that are currently available via RF communications.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Space-based optical communication systems are poised to take a breakthrough role in commercial SmallSat missions, as well as inter-satellite links (e.g., links between large GEO and medium earth orbit (MEO) satellites) and space-to-ground links. New technology developments are enabling the migration from traditional RF designs to optical communications to provide a significant leap in the data downlink capabilities even of space and power constrained LEO SmallSats. For instance, optical communications enable small satellites with greater than 1 Gbps data links, which is physically impossible with RF systems due to antenna size and power requirements.

A factor in the transition from RF systems to optical systems is the availability of a full turnkey solution that seamlessly connects satellites and high-altitude UAVs to servers on the ground, while accommodating the accelerating demand for accurate and frequent data collection from LEO SmallSats. Such an optical connectivity system will increase the speed, security, and efficiency of data transmissions from LEO SmallSats with additional capabilities beyond those provided by RF systems.

One of the key components in this transition is the combination of innovative transceiver and ground station designs that expands the capabilities of optical systems beyond those of RF systems. Using more compact transceiver arrangements operating at optical frequencies that can be conformally mounted without gimbals on aircraft or UAV, for example, would be of great advantage. As mentioned above, there are limitations to the data rates and data capacity of RF SmallSats due to the frequency range and mechanical limitations of the current systems, especially the physical diameter of the required RF antenna. As antennas are reduced in size, the beam divergence must increase, and the amount of RF energy transmitted must increase to put enough energy onto the receiver. Advantageously, optical frequencies allow much smaller output apertures at the same time producing much tighter beam divergences. For instance, currently available RF antennas are on the one to ten meters scale; in contrast, optical systems can be on the order of a few millimeters to several centimeters.

Since a large telescope cannot be mounted onto the top of an aircraft fuselage or on a UAV, for example, the active area can be split into smaller sub-apertures. Having multiple sub-apertures allows implementation of having separate channels to handle different pointing directions, wavelengths, polarizations, modulation rates, relative phase modulation (such as Quadrature Amplitude Modulation (QAM) and binary phase-shift keying (BPSK)), and other channel parameters to increase the capacity of laser communication system. Relative phase modulation, such as QAM and BPSK, is essentially a phase modulation on a single channel where the phase relation is the binary data. Consequently, while for a two-state phase, a digital state of 1 or 0 can be encoded without changing the intensity, more bits can be packed into a single time chunk, if there are more phase state options.

Figure 2:
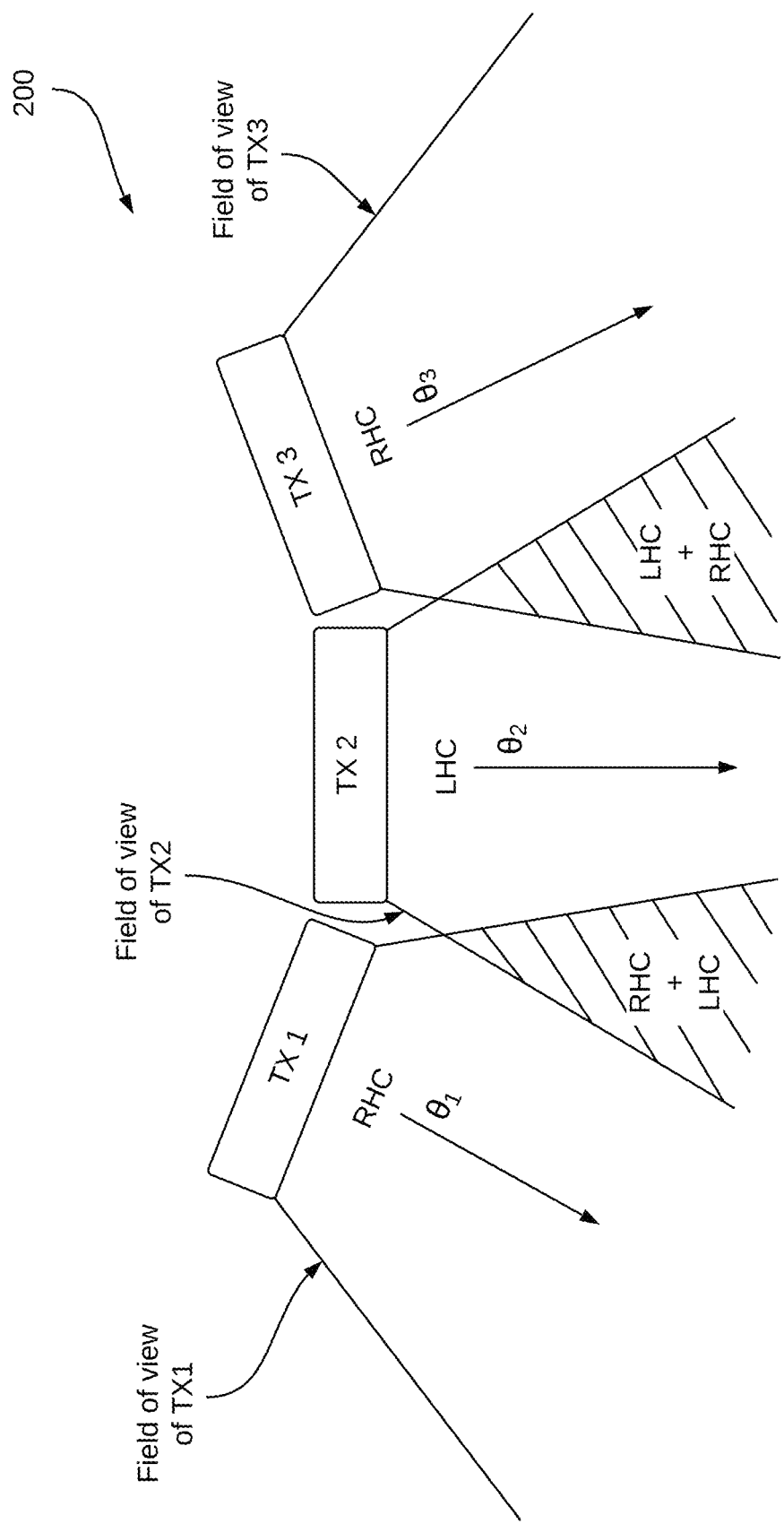
FIG. 2 shows an exemplary transceiver arrangement, in accordance with an embodiment.

An exemplary embodiment of a transceiver with multiple sub-apertures is shown in FIG. 2. In some exemplary embodiments, the sub-apertures are fixedly located on a surface that may be planar or curved. As shown in FIG. 2, optical transceiver 200 is designed with a low profile to allow three sub-apertures (i.e., sub-transceivers TX1, TX2, and TX3) to be mounted pointing at different angles ($\theta_1$, $\theta_2$, and $\theta_3$, respectively). This configuration allows the overall transceiver to send and receive signals over a larger field of view without mechanically moving the transceiver. In some exemplary embodiments, entire field of view is covered by $\theta_1$ to $\theta_N$ and the transceiver does not need to be moved at all to enable optical communication. In other exemplary embodiments, only a part of the entire field of view is covered by $\theta_1$ to $\theta_N$ and a mirror, a gimbal, a piezoelectric motor, or other mechanical or optical arrangement can be used to cover the entire field of view, e.g. by providing a motion that is equal to or greater than $\theta_1$ to $\theta_N$. By using multiple sub-apertures, overlapping (partially or completely) outputs, and parallel optical paths, additional functionality is integrated into the overall network operations.

In another exemplary embodiment, each one of TX1, TX2, and TX3 is configured to send and/or receive signals with different polarization states (e.g., right-hand circular (RHC) and left-hand circular (LHC) polarizations as shown in FIG. 2). Additionally, in the shaded regions shown in FIG. 2, where the emissions from TX1 and TX2, as well as TX2 and TX3, overlap, a beat frequency is created such that the beat frequency can modulated by adding a phase modulation at TX2, for instance. In this way, the interference effect can be used to provide additional modulation control such that essentially an extra data channel can be encoded into the beat frequency signal. In other words, the overlapping regions between sub-apertures enable interesting communication protocols where two channels with orthogonal polarizations can simultaneous transmit two separate data streams. To maintain detection sensitivity level, multiple sub-apertures can be combined into a single detector such as by using fiber couplers, which are simple to use and vibration insensitive. If necessary, one or more erbium-doped fiber amplifiers (EDFAs) can be used to boost the signal.

Additionally, in an exemplary embodiment, each one of TX1, TX2, and TX3 is configured to send/receive signals at a different wavelength from each other. For example, TX1 is configured to emit/receive signals at a first wavelength, TX2 is configured to emit/receive signals at a second wavelength, and TX3 is configured to emit/receive signals at a third wavelength. The integration of multiple wavelengths allows implementation of wavelength-division multiplexing (WDM) options.

In an exemplary embodiment, a mechanical or non-mechanical means for further steering the pointing direction of TX1, TX2, and TX3 is incorporated. For example, a liquid crystal polymer grating (LCPG) can be used for coarse adjustment, and another device such as a fast steering mirror, electrowetting materials, wedged liquid crystal (LC) cell, or other suitable modulators for fine adjustment.

In an exemplary embodiment, one or more LCPGs can be used to simultaneously combine or diversify beams from separate sub-apertures. For instance, beams from separate sub-apertures can be combined using LCPGs to increase the power delivered in a particular direction. Alternatively, specific LCPGs can be used to direct specific beams to different receivers, thus enabling dynamic networking implementations such as pass through, bent pipe, star networks and other configurations. For instance, known TCP/IP (Transmission Control Protocol/Internet Protocol) protocols for two-way communications or uni-directional connections such as via UDP (User Datagram Protocol) can be implemented using the embodiments described herein. Additionally, embodiments described herein are reconfigurable, for example, using LCPGs and other active elements, and a single transceiver can actively send data over a range of transmission angles, thus providing additional advantages. Also, the number of sub-apertures can be adjusted to use, for instance, only the minimum number needed to close a particular communication link, thus resulting in power and cost savings.

Figure 3:
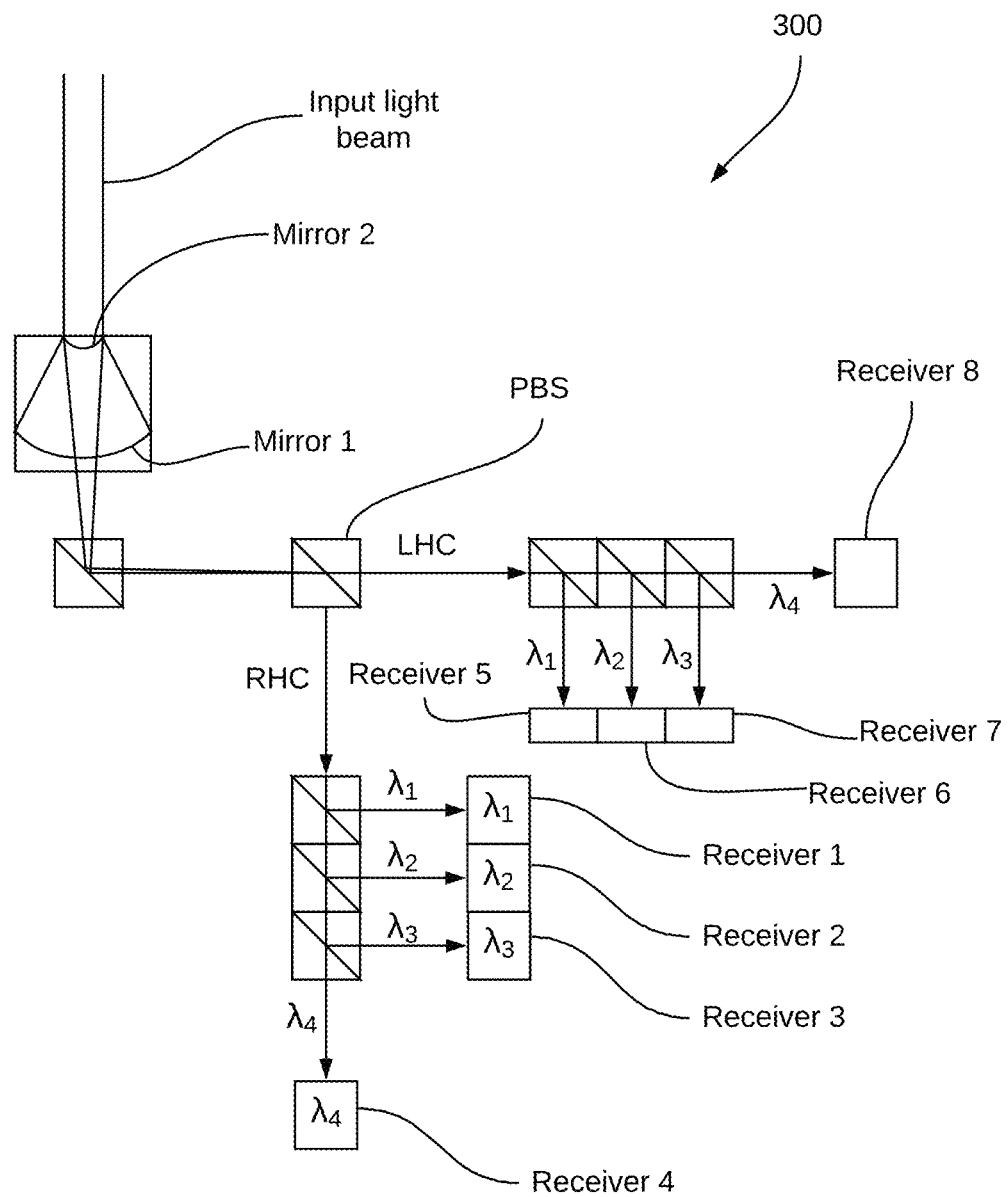
FIG. 3 shows an exemplary ground station arrangement configured to operate compatibly with the exemplary transceiver arrangement of FIG. 2, in accordance with an embodiment.

FIG. 3 shows a wavelength-division multiplexing (WDM) ground station configured for receiving signals from a transceiver such as that shown in FIG. 2. As shown in FIG. 3, signal incident on WDM ground station is focused by mirrors 1 and 2 onto a beam steerer, which directs the signal into a polarizing beam splitter (PBS), which splits the incoming signal into beams with left- and right-hand circular (LHC and RHC) polarizations, respectively. Then, each of the LHC and RHC beams are split into different wavelengths by a series of wavelength-sensitive beam splitters, such that each wavelength, with a particular polarization, is detected at a specific receiver (shown as receivers 1-8 in FIG. 3). In this way, each combination of wavelength and polarization is used as an independent data channel, allowing essentially a dichroic "waterfall" of data.

The pointing angle, wavelength, polarization state, and phase modulation are all different parameters that can be independently selected. Thus, choosing the parameter space allows multiple links to be simultaneously achieved with spatially separated receivers as well as multiplexed data streams on a single link, assuming the other end of the link (e.g., ground station, satellite, or aircraft transceiver) is configured to receive the multiplexed data. For example, sending both RHC and LHC signals to a single receiver allows twice the data rate to be supported. As another example, having two states gives an option for handoff and double data rate schemes, when two sub-apertures are sending data to a ground station.

In another embodiment, using two or more sub-apertures to send the modulated signal to a receiving station allows the doubling (or more) of the signal in intensity and, thus, improve the link budget and reliability. For instance, when distance or environmental conditions, such as clouds or dust, interferes with one sub-aperture, the power sent to the receiver can be doubled (or more) by transmitting the same modulated signal from multiple sub-apertures.

Figure 4:
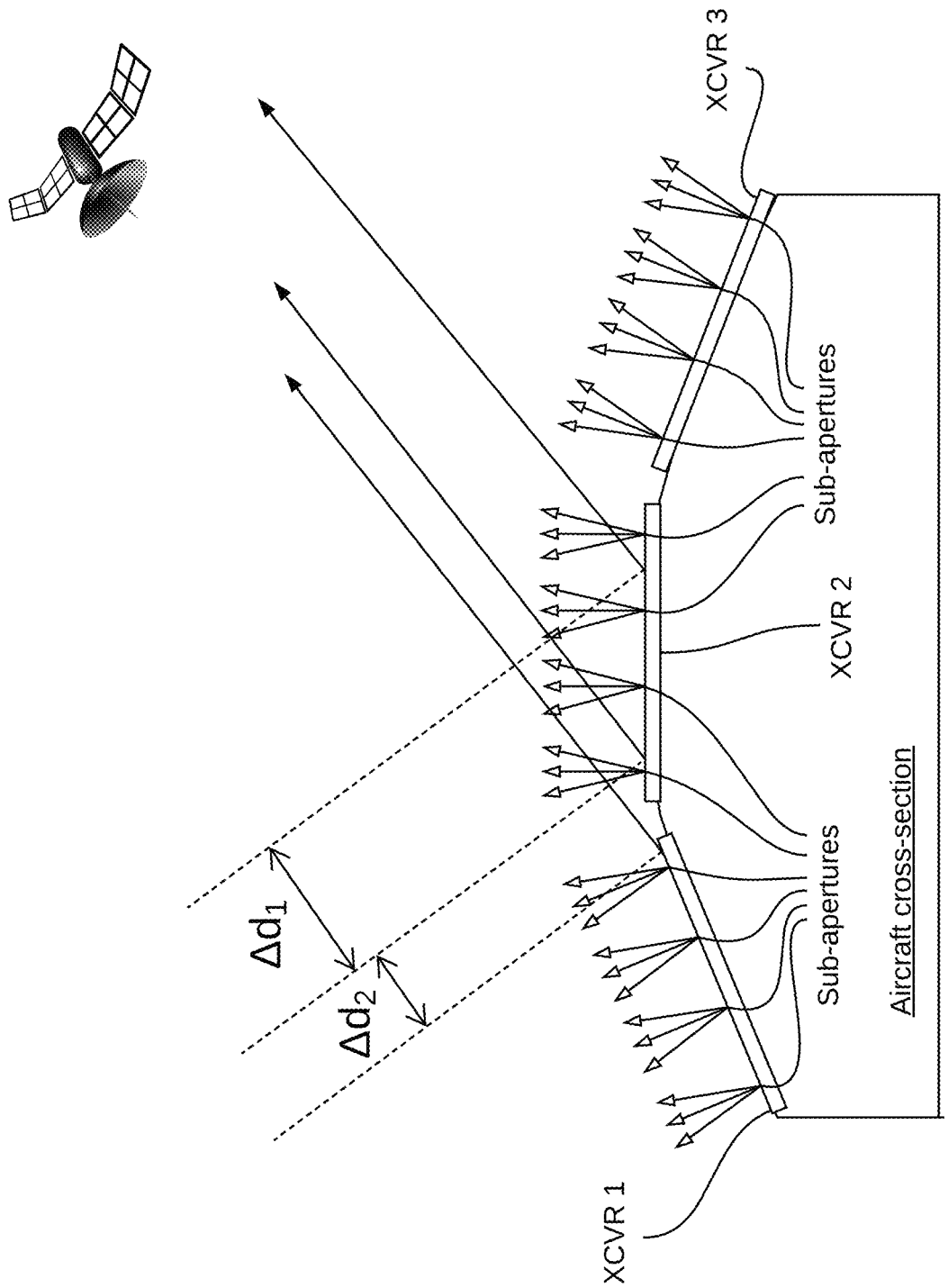
FIG. 4 shows an array of sub-apertures arranged on a curved surface of an aircraft, in accordance with an embodiment.

The use of sub-aperture configurations also allows the placement of multiple apertures on a curved surface, such as the fuselage of an aircraft. An exemplary embodiment is shown in FIG. 4, showing three separate transceivers XCVR1, XCVR2, and XCVR3, each transceiver including multiple sub-apertures, being mounted on different portions of an aircraft fuselage. In fact, rather than just the top of an aircraft or UAV, the transceivers as disclosed herein can be mounted on other locations of an aircraft or UAV, such as on the top, sides, and bottom. The thin design of the transceivers, as described herein, allow flexibility in mounting the transceivers on various locations of an aircraft or UAV without adversely affecting aerodynamics.

Furthermore, mounting multiple transceivers with sub-apertures providing overlapping and/or parallel optical paths on various locations on an aircraft or UAV can provide additional functionality. For example, such a configuration allows the links to be established in multiple direction, including in cases when the aircraft is flying along northern (i.e., great circle) routes near the Earth's poles.

Moreover, by altering the functionality of the different sub-apertures, changes can be made to the network dynamically. For example, certain transceivers can be used as a bent pipe, a broadcast source, or independent communications links with different sources. If the power output from several lower power lasers are combined, the need for additional components, such as erbium-doped fiber amplifiers (EDFAs) can be reduced. For comparison, Freedom Photonics allows the use of 0.5 W 1550 nm packages, which leads to a lower cost compared to EDFAs.

One consideration in the implementation of the transceiver with multiple sub-apertures is the timing alignment of the signals leaving spatially-distinct sub-apertures. For instance, when a receiver is not located equidistantly from the array of sub-apertures transmitting a series of signal pulses, the signal pulses from each sub-aperture will not arrive at the receiver at the receiver and can lead to unwanted interference. In a specific example, for a 10 Gbps signal, the relative timing error between different sub-apertures must be kept below 10 to 15 picoseconds in order to preserve the fidelity of the signal.

Figure 5:
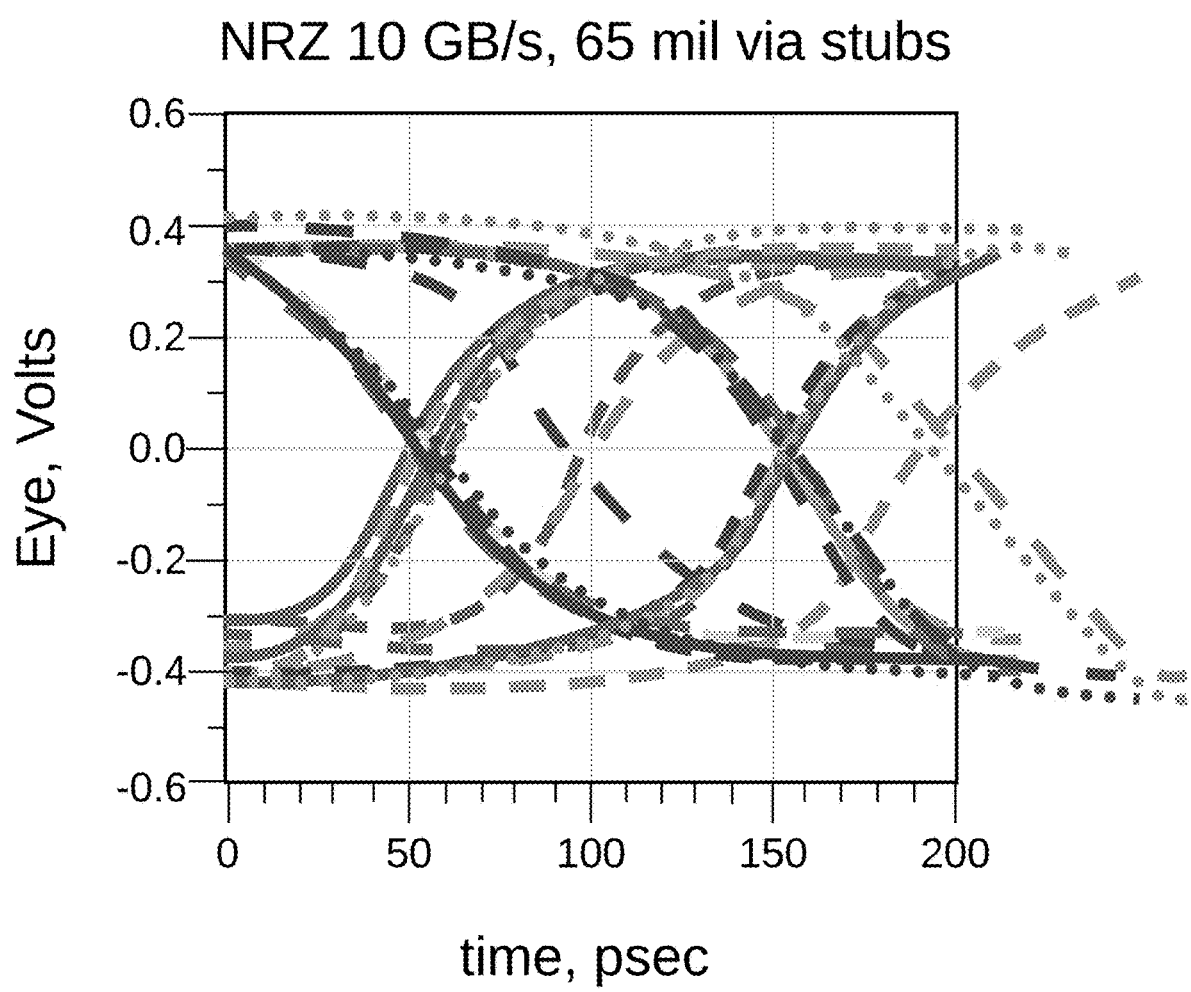
FIG. 5 shows calculated non-return to zero (NRZ) eye diagrams for an exemplary embodiment.

One way to adjust the pulses is by using adaptive optics or delay lines or other delay devices at either the transmission side or the receiver side. Alternatively, the time of emission from various sub-apertures can be adjusted in order to account for the curvature of the transceiver configuration. As shown in FIG. 5, a series of different non-return to zero (NRZ) diagrams illustrate the timing issue with even a 50 psec error, which would blur the data together and destroy any chance to transfer data. That is, if the emissions from the different sub-apertures are not appropriately coordinated (as indicated by the dashed lines crossing through the "eye" with a 50 picoseconds (15 mm) timing error), data transmission becomes impossible. Thus, the effective distance error (see $\Delta d_1$ and $\Delta d_2$ in FIG. 4) from opposing edges of a sub-aperture as well as between sub-apertures must be adjusted to no more than 5 picoseconds (i.e., 1.5 mm) effective matching precision for a 10 Gbps signal. These errors should be compensated using internal timing systems (not shown). In other words, since even a 50 picoseconds timing error can effectively ruin the eye of the NRZ diagram, the effective distance error between sub-apertures must be kept below 5 picoseconds worth of distance (i.e., 1.5 mm). Also, while the signal divergence is not as tight as for an array of sub-apertures than that of a single aperture transceiver, the eye of the NRZ diagram does close, if the sub-aperture emissions are not appropriately adjusted in accordance with the physical curvature.

Since the angle to the target (θ) and the relative position (D) of the sub-apertures is known, a simple calculation is performed to determine the relative timing relation between the sub-apertures.

$$\Delta t = \left(\frac{D}{c}\right) \cos \theta \qquad [\text{Eq. 1}]$$

where Δt is the relative timing, D is the relative position of the sub-apertures, θ is the angle to the target (e.g., the satellite shown in FIG. 4), and c is the speed of light.

Figure 6:
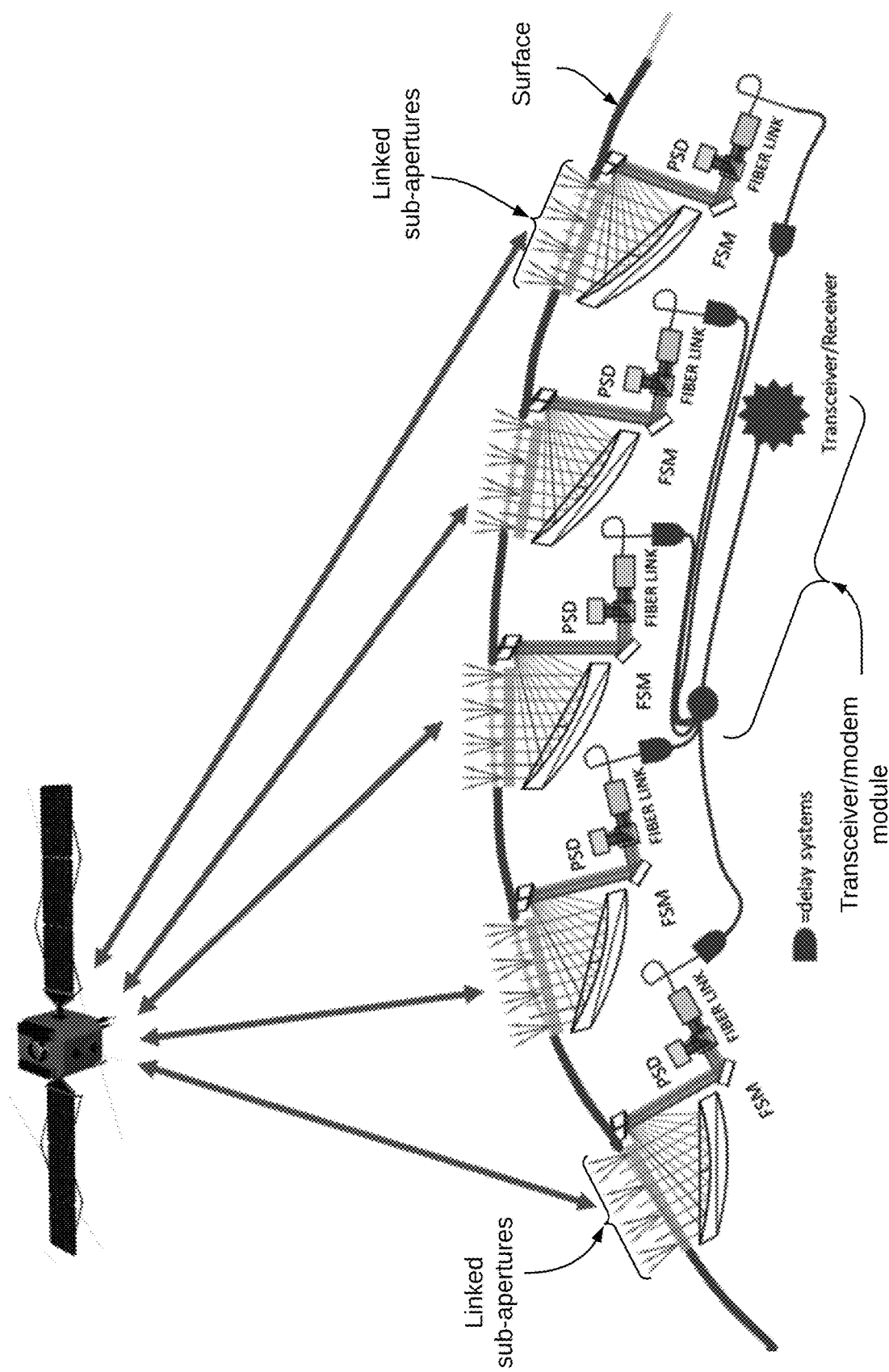
FIG. 6 shows an arrayed configuration of sub-apertures mounted on a surface of a vehicle, such as an aircraft, UAV, or submarine

A further embodiment is shown in FIG. 6, which illustrates an arrayed configuration of linked sub-apertures mounted on a surface of, such as and not limited to, an aircraft, a UAV, a ship, or a submarine. The plurality of sub-apertures are connected via fiber link and may be combined at a single transceiver/modem module to increase the effective surface area and signal-to-noise ratio (SNR). Alternatively, rather than summing the signals from the fibers, they can be split into separate receivers/detectors for simultaneous and distinct links.

The path length differences across curved surfaces should be compensated, especially for high data rates such as 10 gigabits per second (Gbps). Such compensation can be implemented, in an embodiment, using a delay system following the fiber link at each sub-aperture. Also, the transmission laser can be split amongst the different sub-apertures for transmission, if a high-power laser is used.

Figure 7:
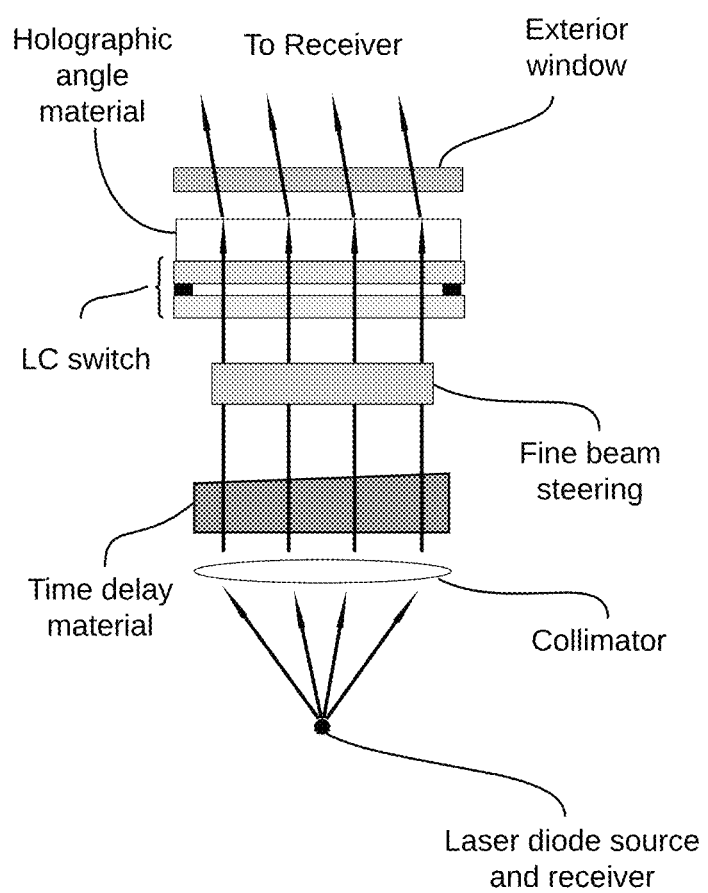
FIG. 7 shows an exemplary transceiver unit in a transmissive configuration, in accordance with an embodiment.

FIG. 7 shows an exemplary transceiver unit in a transmissive configuration, in accordance with an embodiment. As shown in FIG. 7, a transceiver unit includes a laser diode source and receiver, which both emits optical signal coded with data and receives optical signal. The optical signal coding can be performed, for example, by a controller (not shown). Light emitted from laser diode source and receiver is directed through a collimator, then a time delay material, which performs the time delay adjustment discussed above, in accordance with the location of this particular transceiver unit within an array. The time delay material can be, for example, a liquid crystal (LC) material in a conventional flat cell configuration or a wedged cell, fiber optics with an LC core and/or cladding, piezo-electric material, or another suitable material that provides nonhomogeneous optical phase across its aperture or is tunable to provide the appropriate timing adjustment. It is noted that, rather than using the transmissive collimator, a reflective optical element can be used either in combination with the collimator or in place of the collimator for adjusting the optical path of the light rays from the laser diode source.

Continuing to refer to FIG. 7, a fine beam steering element directs the collimated, time-adjusted light toward a specific receiver or makes fine adjustments in the optical path. Transmissive components appropriate for use as the fine beam steering element include, but are not limited to, Risley prisms, wedged LC cells, and mechanically-adjustable prisms including an oil layer therein. In a reflective configuration, the fine beam steering element can be, for example, piezo-electric mirrors, micro-electromechanical systems, and spatial light modulators (such as those available from Boulder Nonlinear Systems). The steered light then is transmitted through an LC switch, which as shown is in the form of an LC material sandwiched between two substrates separated by spacers. The LC switch can be used to make further phase adjustments in the optical signal, or even simply act as a shutter. A holographic layer, formed of a holographic angle material, is then used to direct the optical signal toward a specific receiver upon existing through an exterior window.

It is noted that the order in which the light from the laser diode source encounters the various optical elements (i.e., time delay material, fine beam steering element, LC switch, and holographic angle material) can be modified in order to accommodate, for instance, spacing constraints or need for specific optical beam characteristics. Additional beam shaping and modifying components can also be added into the optical path between the laser diode source and the receiver. Furthermore, each of laser diode source and receiver can function only as a transmitter light source, or only as a receiver for optical signals incident thereon. Moreover, if the holographic angle material is formed in such a way that it does not require an additional protective layer, the exterior window can be eliminated in such instances.

Figure 8:
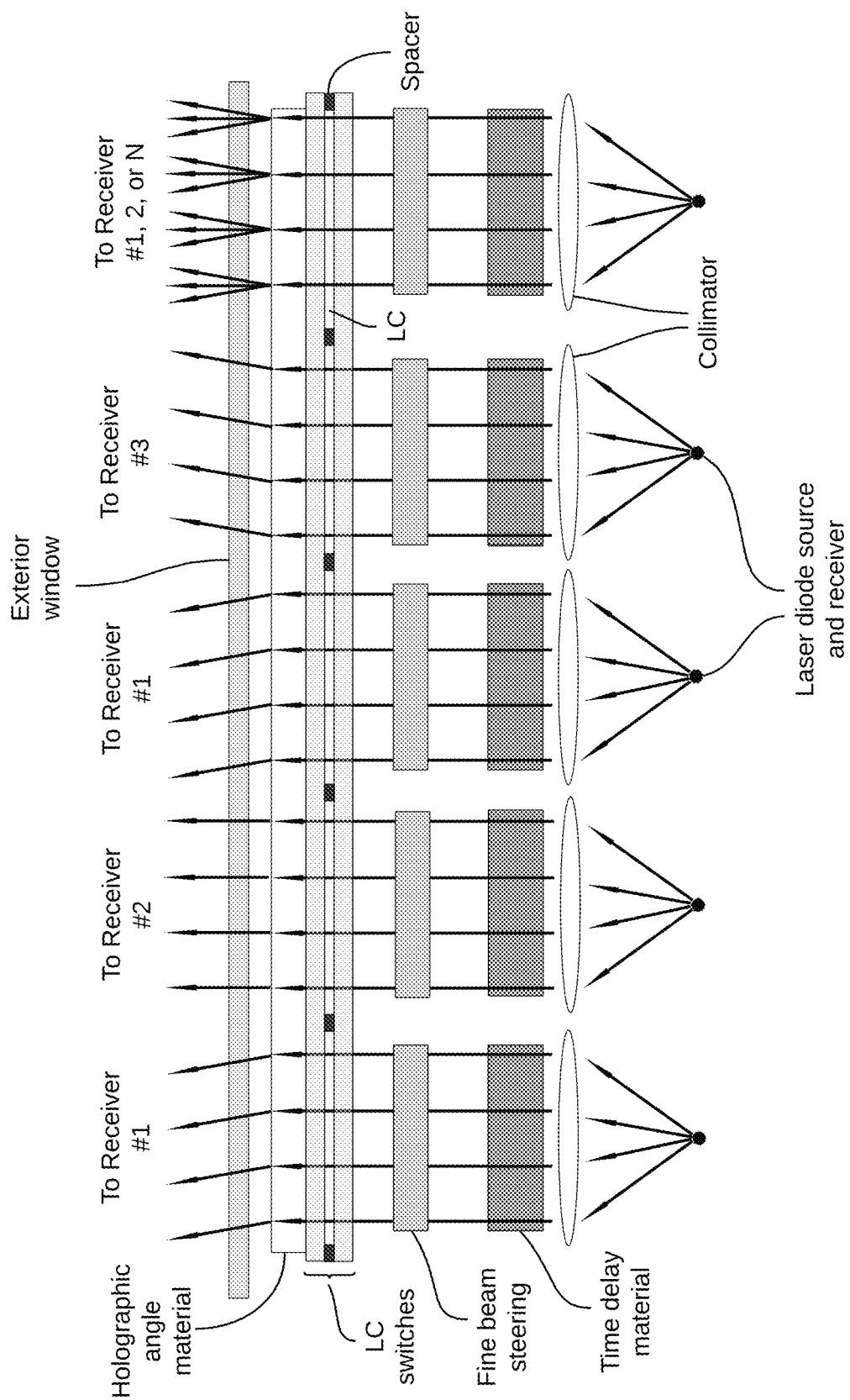
FIG. 8 shows an exemplary array of transceiver units in a transmissive configuration, arranged in a flat array of sub-apertures based on shared substrates, in accordance with an embodiment.

Referring now to FIG. 8, an exemplary array of transceiver units is shown in a transmissive configuration, arranged in a flat array of sub-apertures based on shared substrates, in accordance with an embodiment. In the example illustrated in FIG. 8, the external window, holographic angle material, and LC switches are formed as single layers shared amongst a plurality of transceiver units in an array. This configuration is advantageous for cost and space reduction. Collimators, time delay material, and fine beam steering can still be provided for each laser diode source and receiver, as shown in FIG. 8. Alternatively, these components can also be formed in single layer arrays at a wafer-scale, for example. Such a transceiver including an array of sub-apertures can be used, for instance, within applications such as those shown in FIGS. 2 and 4 as discussed above. As can be seen in FIG. 8, each sub-aperture within the exemplary array of transceiver units can be configured for directing optical signal to one or more specific receivers. The transmission direction of the optical signals can be, for instance, adjusted by the appropriate settings of the time delay material, fine beam steering element, LC switch, and holographic angle material.

Figure 9:
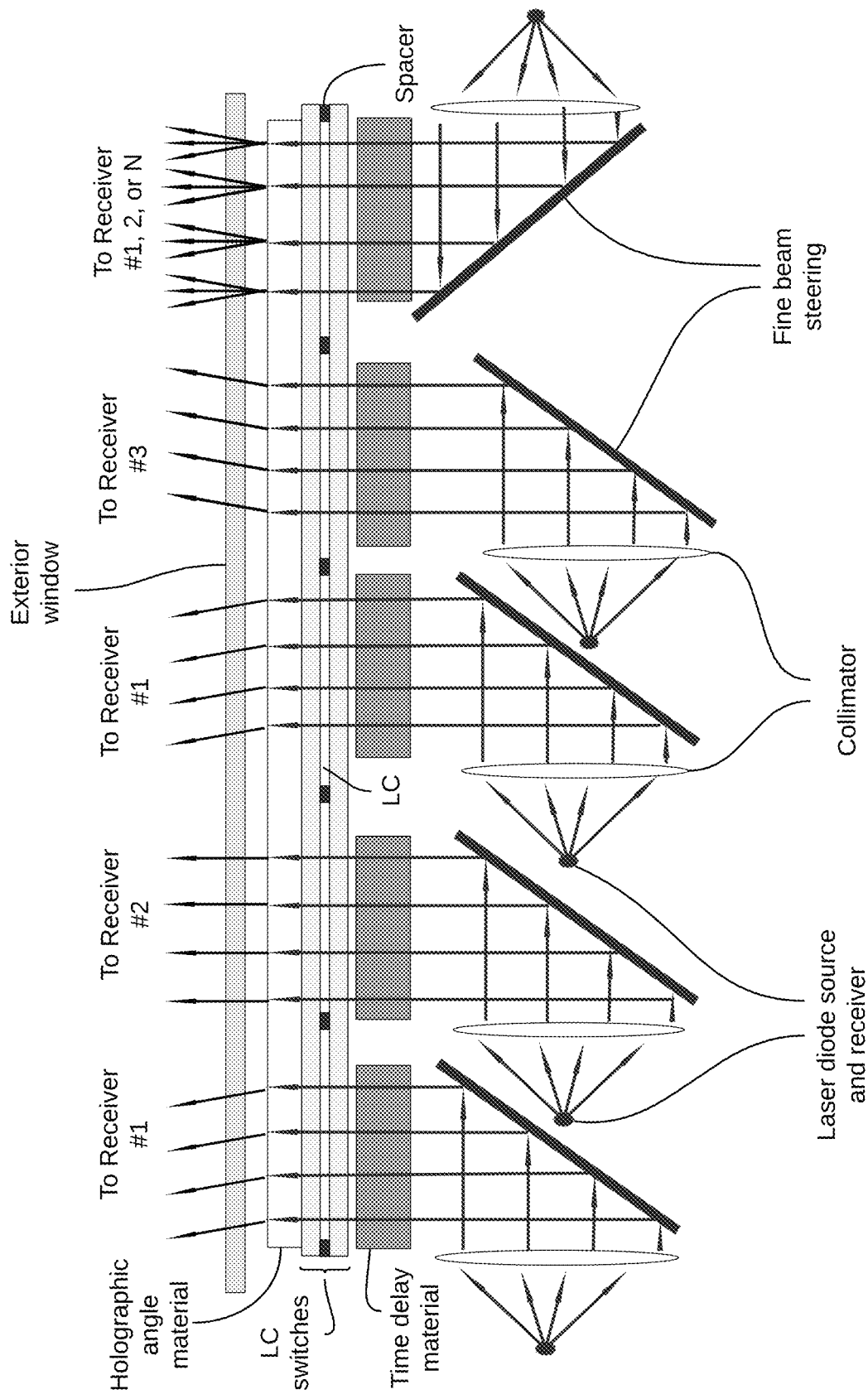
FIG. 9 shows an exemplary array of transceiver units in a reflective configuration, arranged in a flat array of sub-apertures based on shared substrates, in accordance with an embodiment.

FIG. 9 shows an exemplary array of transceiver units in a reflective configuration, arranged in a flat array of sub-apertures based on shared substrates, in accordance with an embodiment. Like the array of transceiver units in FIG. 8, each one of the transceivers units in FIG. 9 includes a laser diode source and receiver. The optical output from the laser diode source is directed through a collimator, then reflected toward a time delay material by a reflective surface. In the embodiment illustrated in FIG. 9, the reflective surface is integrated with a fast beam steering element. Alternatively, a curved reflective element can be used in place of the transmissive collimator, or the beam steering element can be provided in the optical path as a separate element from the reflective element. Like the array of transmissive transceiver units in FIG. 8, the optical signal then is directed through a time delay material for adjusting for timing errors, an LC switch, and a holographic angle material, before being directed toward one or more specific receivers through an exterior window.

In an exemplary embodiment, for the embodiments illustrated in FIGS. 7-9, the time delay material provides a first level of timing and phase adjustment to the optical signal transmitted therethrough, then the fine beam steering element provides a finer resolution of adjustment to the timing and phase of the optical signal. Alternatively, a second time delay element can be added to provide additional tuning. For instance, the signal timing can be coarsely controlled by current modulation of the laser diode sources across the array. While such coarse adjustment can be sufficient to synchronize the timing of different beams in certain applications, one or more additional modulators can be used to fine tune the timing and phase relationship between the optical signals produced by different laser sources across the array. Appropriate modulators can include, for example, LC materials, lithium niobite components, piezo-electric components, acousto-optical elements, and an optical bottle resonator (such as those available from OFS Optics).

A distinct advantage of the embodiments described herein is that they enable high data transmission rates over a broad range of angles, without requiring high pointing accuracy of the transmitter with respect to the receiver. While line of sight is still required, the availability of detection and transmission over a wide range of angles opens up a host of heretofore unavailable applications for these free space optical communications systems. For example, in certain military applications in which RF communications are not possible or covert, secure communication is desired, the embodiments described herein allows such communications using optical means via transceivers with multiple sub-aperture configurations. The transceivers can be mounted, for instance, on helmets for inter-personnel communications, on vehicles (e.g., on a post or aerial) for vehicle-satellite-personnel-mission control communications, and on UAVs for communications between military units and mission control.

The embodiments described herein are also applicable for aeronautical use, such as satellite-to-plane, plane-to-plane, plane-to-ground, air-to-underwater and space-to-underwater communications, as well as communications between underwater locations. In addition to airplanes, other aerial, terrestrial, and nautical moving objects include, but are not limited to, balloons, aerostats, dirigibles, unmanned aerial vehicles (UAVs), cars, trucks, ships, submarines, missiles, and rockets. Additionally, terrestrial applications, such as automotive, person-to-person or person-to-satellite communications are also possible. For instance, the embodiments described herein can be used to set up ad hoc networks between a user and nearby ground stations, or even for commercial purposes such as for directing communications at pedestrians with specialized equipment (e.g., wearable transceivers) and sending advertising information to installed electronic signs or even light posts. Furthermore, rather than a curved arrangement of multiple sub-apertures, the sub-apertures can be arranged in a flat configuration with the same orientation angle, akin to a solar panel, and installed on flat surfaces, such as on stealth planes or other flat surfaces.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or subcombination.

For instance, while the various embodiments above have been described as transceivers, each transceiver can also be configured to function solely as a transmitter or a receiver, not both. Such specialized transmitter or receiver systems can be less costly than dual-use transmitter systems. As another example, rough adjustment of the pointing angles of the multiple sub-apertures can be performed using a switching mechanism, such as a liquid crystal polymer grating, while fine adjustment can be performed using a finer mechanism, such as fast steering mirrors. Alternative mechanisms for providing such angular adjustment are, and not limited to, retro-reflectors with a back-facet modulator, two-dimensional implementations such as the liquid crystal modulators available from Vescent Photonics, MEMS modulators, electro-wetting materials from University of Colorado at Boulder and acousto-optic modulators, each of which may be used for either coarse or fine adjustment.

As another example, the optical signal can simultaneously contain two or more polarization states, each polarization state carrying a stream of data. Each of the multiple sub-apertures can be configured to receive one of the two or more polarization states, while ignoring optical signals with other polarization states, such that the optical signals with different polarization states are separately detected at different sub-apertures. For instance, the optical signal can contain multiple polarization states such that the different polarization states are detected by different sub-apertures. The optical signals of different polarization states can then be compared using a comparative mechanism. The comparison can be used, for example, to verify the authenticity of a given optical signal. As an example, if the optical signal is found to contain a specific polarization state, which should not have been included in an authentic signal, then that optical signal can be discarded as faulty. Alternatively, if the comparison between the optical signals with different polarization states shows the polarization states are not following a known pattern, then that optical signal can again be discarded as faulty. In other words, the optical communications transceiver, in an embodiment, can include first and second sub-apertures configured for receiving optical signals containing first and second polarization states, respectively. The transceiver can further include a comparative mechanism for comparing the optical signal received at the first and second sub-apertures for, as an example, verifying the authenticity of the optical signal received by encoding an additional channel of data onto the comparison signal between the sub-apertures. Additionally, with a priori knowledge of the physical arrangement of the transmitter sending the data as well as the encoding of the comparison signal, the receiver can verify the authenticity of the received optical signal to avoid being spoofed by a false transmitter. For instance, the authenticity of the received optical signal can be ensured by encoding an additional channel of data onto a comparison signal between sub-apertures as an authenticity "fingerprint."

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. An optical communications transceiver for use in free space communication between a satellite and a ground station, the optical communications transceiver comprising an array of transceivers configured to enable the optical communications transceiver to transmit and receive signals over a plurality of angles, wherein the array of transceivers conformally mountable on a surface of the satellite, and
a time delay component configured to adjust a delay for each error based upon timing errors between one or more of the transceivers in the array of transceivers located at different locations within the optical communication transceiver.

2. The optical communications transceiver of claim 1, further configured for transmitting signal over the plurality of angles without physically moving the optical communications transceiver to those angles.

3. An optical communications transceiver for use in free space communication between two objects selected from a satellite, a ground station, and a moving object, the optical communications transceiver comprising:
an array of transceivers configured to enable the optical communications transceiver to transmit and receive optical signals over a plurality of angles without physically moving the transceiver to those angles,
wherein each one of the transceivers in the array of transceivers is mounted at an orientation angle, which is different from the orientation angle of every other one of the array of transceivers, and
wherein the array of transceivers is conformally mounted on a surface of at least one of the two objects, and
a delay system for adjusting a delay for each error based upon timing errors between one or more of the transceivers in the array of transceivers due to being mounted at different orientation angles.

4. The optical communications transceiver of claim 3, wherein optical signals received at the array of transceivers are combined and directed to a single detector.

5. The optical communications transceiver of claim 4, wherein optical signals received at the array of transceivers combined using fiber couplers and directed to the single detector.

6. The optical communications transceiver of claim 5, wherein optical signals received at the array of transceivers are amplified before being directed to the single detector.

7. The optical communications transceiver of claim 3, wherein each one of the transceivers in the array of transceivers is configured for receiving optical signals at a wavelength, which is different from the wavelength receivable at every other one of the transceivers in the array of transceivers.

8. The optical communications transceiver of claim 3, wherein at least one of the transceivers in the array of transceivers is configured for receiving optical signals with a polarization state, which is different from the polarization state receivable at every other one of the transceivers in the array of transceivers.

9. The optical communications transceiver of claim 3, wherein in each one of the transceivers in the array of transceivers is conformally mounted on a curved surface of the moving object at an orientation angle that is different from the orientation angle of every other one of the transceivers in the array of transceivers.

10. The optical communications transceiver of claim 3, wherein at least one of the transceivers in the array of transceivers further comprises a steering apparatus for adjusting the orientation angle of the at least one of the transceivers in the array of transceivers.

11. The optical communications transceiver of claim 3, further comprising a holographic element to direct the received optical signal toward a periphery of a window to be coupled into optical fibers for processing at the array of transceivers.

12. The optical communication transceiver of claim 3, wherein the orientation angle of two of the array of transceivers at least partially overlap each other.

13. An optical communications transceiver for free space communication between at least two of a satellite, a ground station, and a moving object, the optical communications transceiver including an array of transceivers conformally mounted on a curved surface of the at least one of the satellite, the ground station, and the moving object, each one of the transceivers in the array of transceivers being oriented at a different angle from each other such that the optical communications transceiver is capable of receiving optical signals over a plurality of angles, without physically moving the optical communications transceiver to those plurality of angles,
and linking together the optical signals so received via fiber link at a single detector; and
a time delay component configured to adjust a delay for each error based upon timing errors between one or more of the transceivers in the array of transceivers located at different locations within the optical communication transceiver.

14. The optical communications transceiver of claim 13, wherein the optical signals received at the optical communications transceiver are amplified before being directed to the single detector.

* * * * *